United States Patent [19]

Mack

[11] 4,302,154
[45] Nov. 24, 1981

[54] INTEGRATED TRANSMISSION AND ROTOR HEAD

[75] Inventor: John C. Mack, Glenn Mills, Pa.

[73] Assignee: The Boeing Company, Seattle, Wash.

[21] Appl. No.: 79,270

[22] Filed: Sep. 27, 1979

[51] Int. Cl.³ .............................................. B64C 27/74
[52] U.S. Cl. ................................. 416/114; 416/170 R
[58] Field of Search .................. 416/114, 115, 170 R, 416/170 B

[56] References Cited

U.S. PATENT DOCUMENTS

| | | | |
|---|---|---|---|
| 2,620,880 | 12/1952 | Avery | 416/114 |
| 2,984,306 | 5/1961 | Kottsieper | 416/114 X |
| 3,087,690 | 4/1963 | Doman et al. | 416/170 B X |
| 3,188,884 | 6/1965 | Bancroft | 416/170 B X |

FOREIGN PATENT DOCUMENTS 494153  7/1953  Canada ................................ 416/114

Primary Examiner—Everette A. Powell, Jr.
Attorney, Agent, or Firm—Robert S. Lipton; Jack D. Puffer

[57] ABSTRACT

An integrated transmission and helicopter rotor head is disclosed. Lift and bending moments generated by the rotating hub are carried by non-rotating support structure. The rotating rotor shaft is adapted to carry only torque loads. Partial gear reduction takes place above the rotor shaft, thereby reducing its torque loading. The invention includes a planet gear assembly wherein the ring gear is connected to the rotating hub, while the rotor drive shaft causes rotation of the sun gear. The hub swashplate is located above the hub with its control rods passing through the planet gear assembly.

1 Claim, 3 Drawing Figures

INTEGRATED TRANSMISSION AND ROTOR HEAD

BACKGROUND OF THE INVENTION

1. Field of the Invention

This invention relates to helicopter transmissions and rotor hubs generally, and more particularly, to an integrated helicopter transmission and rotor assembly.

2. Description of the Prior Art

Helicopter rotors are generally connected to the helicopter by a drive shaft which is connected to a transmission. All forces generated by the rotor including, lift and various bending moments are carried by the rotor drive shaft. The rotor shaft is in turn connected to the helicopter transmission which, of course, also carries these loads. The transmission reduces the relatively high velocity low torque input from the helicopters engine to a low RPM high torque output to drive the rotor through the rotor shaft.

Since both certain portions of the transmission and the rotor shaft carry all of the loads generated by the rotor, these components are relatively heavy.

The transmission is generally located in the top portion of the helicopter fuselage. The rotor shaft and rotor are, of course, located above the transmission. The rotor controls which cause rotation of the rotor blades about their pitch axis are also generally located between the rotor and the fuselage. The swashplate is generally located below the blades and includes rotating and non-rotating components. Pitch links connect the blades to the rotating portion of the swashplate. Push-pull rods, which are connected to the non-rotating portion of the swashplate, are connected to pitch actuators which are connected to the fuselage.

A helicopter rotor is, of course, generally located above the aircraft fuselage. For any particular helicopter design there is an optimum height the rotor should be positioned above the aircraft. If the rotor is above that optimum height a weight and aerodynamic penalty may be incurred. The excess weight results from the added structure while the aerodynamic penalty is primarily in the form of excess drag.

If the rotor height is below the optimum height other problems arise, mainly from aerodynamic interaction between the body of the aircraft and the rotor. Excess vibration, noise and various aerodynamic effect are the types of problems which may arise in this instance.

In general the helicopter designer's problem is to lower the rotor towards the optimum height. This primarily results from the current configurations of transmissions and rotors, coupled with the requirement that the transmission be located in the top of the aircraft fuselage in order to provide adequate internal cabin space. In some cases this latter requirement forces the transmission to protrude above the fuselage. Additionally, the rotor is forced upwards in order to make room for the rotor control system, including the swashplate and pitch actuators.

The added increment of height required to accommodate the pitch actuators and swashplate extends the drive shaft with an attendant increase of weight.

These problems are generally recognized and well known in the helicopter art. The invention disclosed in U.S. Pat. No. 3,486,832 issued Dec. 30, 1969 to Stone lowers a helicopter rotor head by integrating a helicopter transmission with a rotor drive shaft. Stone also integrates the transmission and swashplate.

The invention disclosed in U.S. Pat. No. 3,080,002 issued Mar. 5, 1963 to DuPont lowers the height of a helicopter rotor by placing the swashplate above the rotor head.

SUMMARY OF THE INVENTION

A primary object of the present invention is to permit a reduction of the height of a helicopter rotor hub.

Another object of the present invention is to reduce the combined weight of a helicopter transmission and rotor hub.

Another object of the present invention is to provide integrated helicopter transmission and rotor hub assembly.

Still another object of the present invention is to provide an integrated helicopter transmission and rotor hub assembly having a drive shaft which is only subjected to torque loading.

Still another object of the present invention is to provide a rotor control system with its swashplate located above the rotor hub.

The present invention includes a rotor hub which is supported by a non-rotating housing. The hub includes the ring gear of a planet gear assembly. Non-orbiting planet gears are caused to rotate by a sun gear which is connected to the upper portion of a drive shaft.

Helicopter engine output drives the lower portion of the drive shaft through bevel gears which provide first stage reduction. Second stage and final gear reduction is accomplished by the planet gear assembly. The ring gear and rotor hub is supported by the stationary mast through bearings.

The swashplate is located above the hub and is also supported by the non-rotating housing. The non-rotating portion of the swashplate is connected to actuators through a push-pull rod which passes through the non-rotating planet gears.

Other objects, features and advantages of the present invention will be apparent from the description which follows, taken together with the accompanying drawings in which like numerals refer to like parts.

DESCRIPTION OF THE PREFERRED EMBODIMENT

Figure 1:
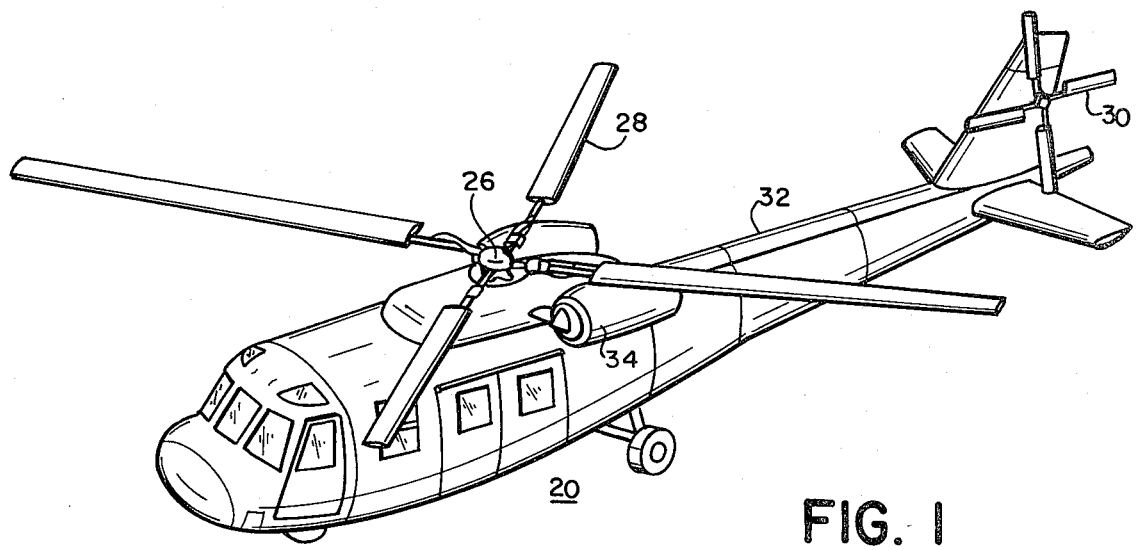
FIG. 1 shows a helicopter utilizing the present invention.

A helicopter 20 embodying the present invention is shown in FIG. 1. The helicopter 20 has a main rotor 22 which includes a hub 26 and rotor blades 28. An anti-torque tail rotor 30 is shown connected at the rear of the aircraft fuselage 32. The main rotor 22 is driven by one or more engines 34.

As is well known to those in the helicopter art, there are many different types of rotor systems. These rotor systems include fully articulated systems as well as the so-called rigid rotor systems. Additionally, there are various modifications of these systems as well as hybred rotor systems which combine some of the features of each. The present invention will be shown adapted to a so-called hingeless rotor system, i.e., one in which flap and lead-lag motions occur without the use of bearings. However, the present invention may be adapted, by those skilled in the art, to most of the currently known systems.

As generally used in the helicopter art, the term "rotor hub" generally refers to that rotating portion of the rotor system to which the blades are attached. As generally used, a transmission refers to that assembly of gears and the like which reduces the engine RPM output to rotor RPM input. As previously indicated, the transmission is generally located between the engine and the rotor shaft. The rotor shaft generally directly drives the rotor hub. As used herein, the word "transmission" shall be deemed to mean any structure which participates in reducing engine RPM to rotor RPM, notwithstanding the fact that it may also form a portion of the rotor hub or be located between the rotor hub and the rotor shaft. This definition of "transmission", in its broadest sense, is necessary as the present invention integrates a portion of the structure which would normally be considered a part of the transmission, as that term is generally used, with the rotor hub.

Figure 2:
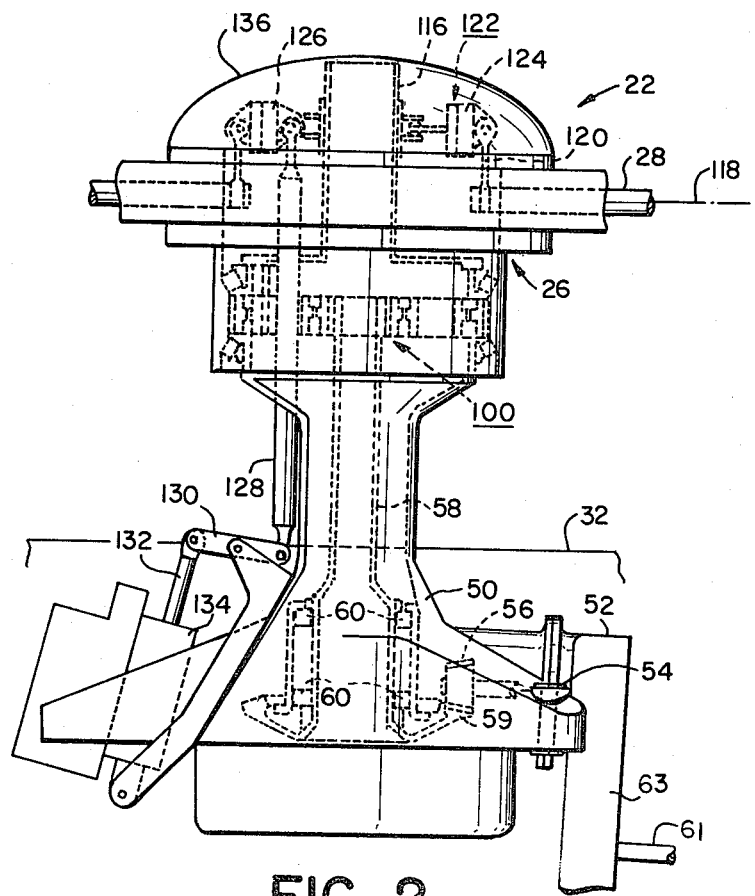
FIG. 2 shows an integrated helicopter transmission and rotor hub of the present invention.

Referring now to FIG. 2 we see an integrated helicopter transmission and rotor hub of the present invention. The invention is shown connected to and supported by a non-rotating housing 50. The housing 50 is connected to the aircraft by suitably connecting it to primary load carrying members 52, one of which is shown, by suitable connecting means 54. Output from engines 34 rotates a bevel gear 56 at engine RPMs. The bevel gear 56 causes rotation of the rotor shaft 58 through interaction with bevel gear 59 which is integrally formed as part of the shaft 58. The lower portion of the rotor shaft 58 is supported by roller bearings 60. Due to the gear ratio between the bevel gear 56 and the rotor shaft 58 the rotor shaft 58 rotates at a lower speed than the bevel gear 56. This results in an initial first stage reduction in the transmission of power from the engine 34 to the rotor 22. The bevel gear 56 is driven by the engine by suitable means, not shown.

Engine output also drives shaft 61 which protrudes from a combining gear box 63, through reduction means, not shown, which drives the anti-torque tail rotor 30.

Figure 3:
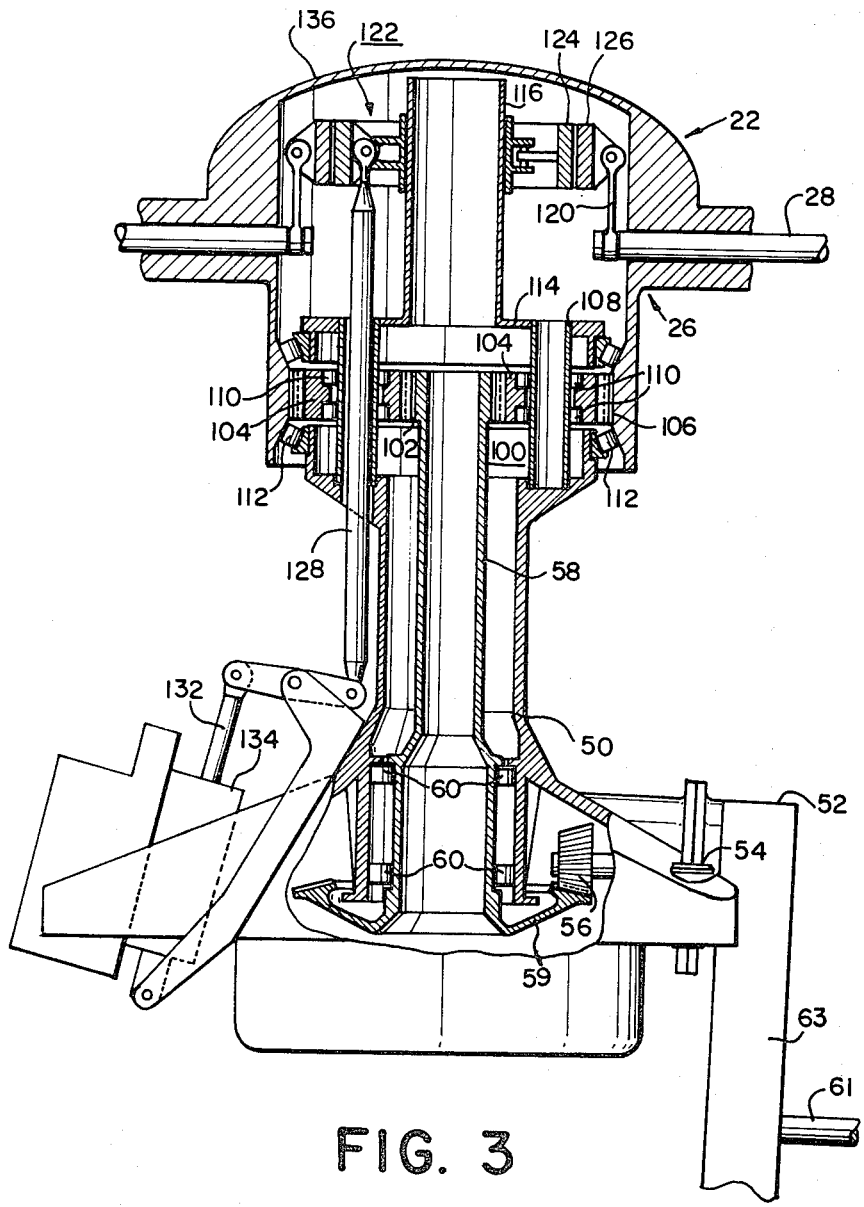
FIG. 3 is a partial section view of the invention depicted in FIG. 2.

The present invention utilizes a planet gear assembly 100, which may be best seen in FIG. 3. The gear assembly 100 includes a sun gear 102 and planet gears 104. The planet assembly 100 also includes a ring gear 106 which is integrally formed as a portion of the hub 26. The rotatable planet gears 104 are connected to a non-rotating planet post 108 through the use of bearings 110. The planet post 108 is rigidly connected to the stationary housing 50. The planet gears which are under negligible vertical loads are prevented from moving vertically with respect to the planet post 108 through conventional means, not shown.

Rotation of the rotor shaft 58 in turn causes rotation of the sun gear 102. Rotation of the sun gear 102 in turn causes rotation of the planet gears 104. The planet gears 104 which rotate are prevented from orbiting about the rotor shaft by the planet post 108. Rotation of the planet gears 104 in turn drives the ring gear 106. Due to the gear ratio between the sun gear 102, the planet gears 104 and the ring gear 106 the ring gear is caused to rotate at a lower RPM than the rotor shaft 58. This is the second and final gear reduction stage in the transmission process.

The embodiment of the integrated rotor hub and transmission, of the present invention, described herein has been designed for a relatively small helicopter. Aircraft of this type typically have rotor RPM's of approximately 400 RPM while their engines may have operating RPM's as high as 6,000 RPM. This would require an overall gear reduction ratio of about 15 to 1. In the present embodiment this has been accomplished in two stages. The first stage, at bevel gears 56 and 59, has a gear reduction ratio of 3 to 1 while the second stage, at the planet gear assembly, has a gear reduction ratio of 5 to 1. In the present embodiment the bevel gear 56 operates at engine RPM. There are other helicopter designs where additional gear reduction may take place separate and apart from the rotor transmission, for instance in the combining gear box 63. This additional gear reduction is more likely to occur in large helicopters which have lower operating rotor RPM's, typically about 240 RPM.

The hub 26 is connected to, and supported by the non-rotating housing 50 through roller bearings 112. The upper roller bearings 112 are connected to non-rotating member 114 which is in turn rigidly connected to the upper portion of the post 108. Additional support may be provided by connecting member 114 directly to housing 50 by additional members which would pass through the space between the planet gears 104. A non-rotating stand pipe 116 is in turn connected to member 114. The rotor blades 28 are connected to the hub 26 by well known and suitable means, not shown.

From the foregoing description it may be easily seen that all loads, except torque, generated or carried by the rotor hub 26 are transmitted to the non-rotating housing 50 through the roller bearings 112. Thus, it may be seen that the rotor shaft 58 may be designed so as to only carry torque loading. This permits a lighter weight shaft to be designed.

The rotor blades 28 are connected to the hub 22 so as to permit rotation about their longitudinal axis 118. The rotor blades are caused to pitch about their longitudinal axis 118 by pitch links 120. The pitch links 120 are connected to a swashplate assembly 122 which includes a rotating portion 124 and a non-rotating portion 126 of the swashplate 122 is secured to the non-rotating stand pipe 116. The non-rotating portion 126 of the swashplate 122 is connected to the stand pipe 116 by well known means which permit vertical travel of the swashplate 122 along the stand pipe 116 and also permits the swashplate 122 to tilt or gimbal about the stand pipe 116. Vertical movement and tilting of the swashplate is accomplished by push-pull rods. The push-pull rods 128 are connected by links 130 and 132 to control actuators 134, only one of which is shown. As is well known to those skilled in the helicopter art, the control actuators 134 through push-pull rods 128 cause movement of the swashplate 122 which in turn rotate the rotor blades 28 about their longitudinal axis in an appropriate manner required to effectuate aircraft control in accordance with the pilots commands.

In the present embodiment of the invention the push-pull rods 128 pass through the planet post 108 which in turn passes through the center of and supports the planet gear 104. Alternate embodiments may be designed where the push-pull rods 128 pass through the space between the planet gears 104 but within the circumference of the ring gear 106.

Thus, it may be seen that by placing the swashplate 122 above the main portion of the hub 26, the hub 26 is permitted to be closer to the top of the aircraft fuselage 32. Additionally, since portions of what would generally be considered the aircrafts transmission are located above the rotor shaft 58. The remaining portion of the transmission which lies below the rotor hub 22 may be made smaller, thus, more easily accommodating the control actuators 134. This enables the control actuators to be placed below the upper surface of the fuselage 32 permitting a further reduction in the height of the rotor hub 26. A significant decrease in aerodynamic drag is also achieved by being able to place the control actuators 134 within the aircraft fuselage 32 and by being able to enclose the pitch links 120, and the swashplate 122 within an aerodynamically faired housing 136.

As may be understood by those skilled in the art from the foregoing description and drawings, the present invention represents a significant advance over the prior art. While the invention has been illustrated and disclosed with reference to a particular embodiment, it is to be understood that various changes and modifications may be made without departing from the spirit of the invention.

What is claimed is:

1. A rotorcraft hub and transmission system, adapted to be driven by an engine which comprises:
   a non-rotatable housing connected to the rotorcraft;
   a rotor shaft having an upper end and a lower end for transmitting torque, said shaft being positioned within said housing;
   a bevel gear connected to the engine and connected to said lower end of said shaft adapted to cause rotation of said shaft, said shaft and said bevel gear interface being adapted to cause a first stage of gear reduction,
   a planet gear assembly including a ring gear, planet gears adapted to engage said ring gear, and a sun gear adapted to engage said upper end of said drive shaft and said planet gears, each of said planet gears being rotatably connected to a post, said posts forming a portion of said housing to prevent them from orbiting about said sun gear, said planet gear assembly being adapted to cause a second stage of gear reduction;
   a rotatable hub including rotor blades operably connected thereto, said blades being rotatable about a pitch axis, said ring gear forming an integral portion of said hub, and said hub being rotatably connected to said housing by bearing means which transmit axial loads and bending moments between said hub and said housing; and
   control means connected to a non-rotating portion of the rotorcraft and to said rotor blades for causing rotation of said blades about their pitch axis, said control means including control rods passing through said planet gears and said posts, and further including a swashplate positioned above the plane of rotation of said blades, said swashplate including a non-rotating portion tiltably and slidably connected to a stand pipe forming a portion of said housing, said stand pipe being connected to said posts, said swashplate further including a rotating portion connected to said blades so as to permit said swashplate to cause rotation of said blades about said pitch axis, said control rods being connected to said non-rotating portion of said swashplate; whereby the length of said rotor shaft may be minimized thereby permitting the height of the rotor above the rotorcraft to be minimized.

* * * * *